UNITED STATES PATENT OFFICE.

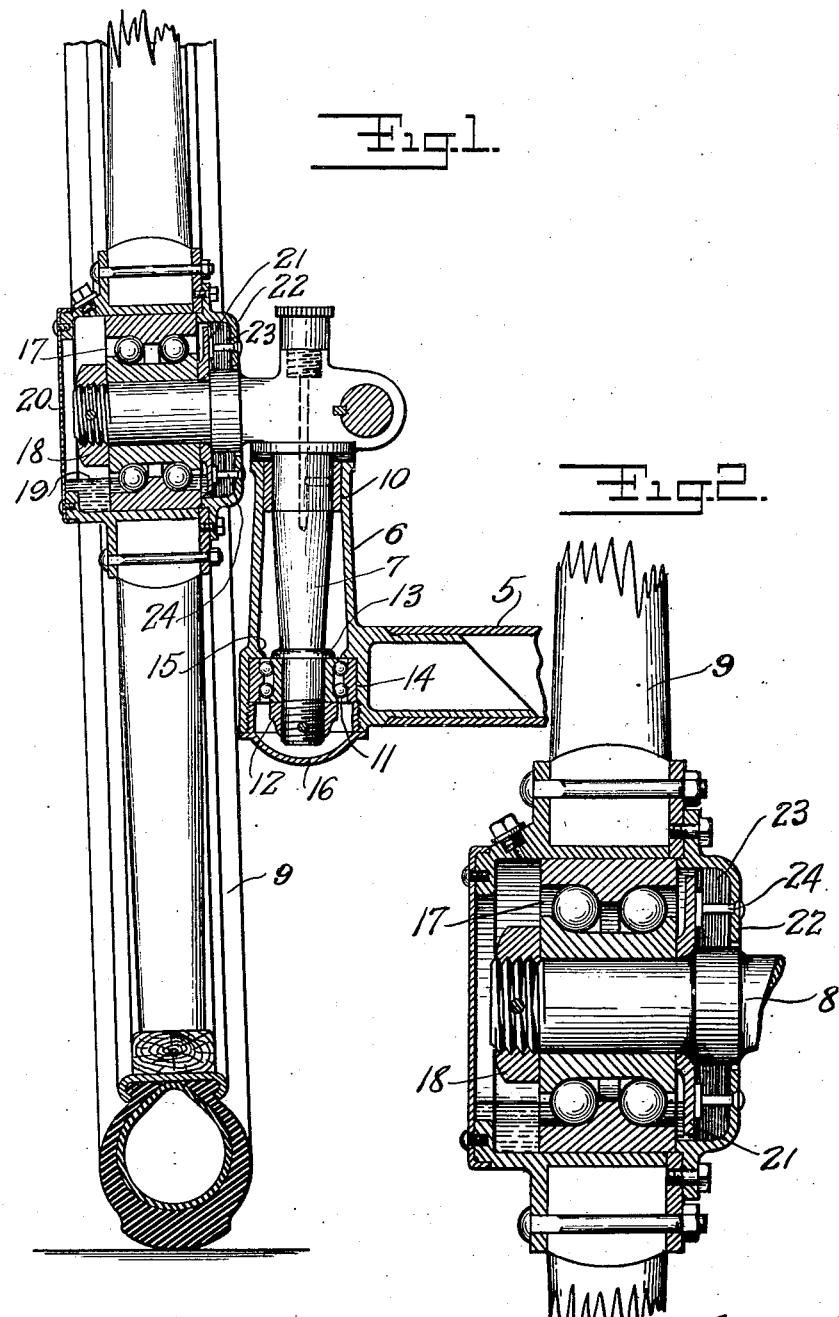

CECIL M. BILLINGS, OF BROOKLYN, NEW YORK.

AXLE CONSTRUCTION.

1,418,276.     Specification of Letters Patent.    Patented June 6, 1922.

Application filed June 29, 1920. Serial No. 392,696.

*To all whom it may concern:*

Be it known that I, CECIL M. BILLINGS, a citizen of the United States of America, and a resident of Brooklyn, county of Kings, and State of New York, have invented certain new and useful Improvements in Axle Constructions, of which the following is a specification.

This invention relates to axle constructions and particularly to the bearing features thereof.

The objects of the invention are to prevent loss of lubricant at the bearing for the road wheel and to provide an efficient and, at the same time, a simple and practical supporting bearing for the steering spindle which carries the road wheel.

In the accomplishment of these and other objects I have developed a number of novel features of construction, combination and arrangement of parts, as will be hereinafter described.

One of the practical embodiments of the invention is illustrated in the accompanying drawing forming a part of this specification, but it is to be understood that the structure may be modified in various ways without departure from the true spirit and scope of the invention.

Figure 1, in the drawing referred to, is a vertical sectional view of a front axle construction embodying features of the invention.

Figure 2 is an enlarged sectional view, illustrating particularly the oil retaining means.

5 designates the axle which is shown as of tubular construction and as having secured to the end thereof, an upright housing 6 in which is journaled the spindle 7 which carries the angularly projecting stub axle 8 for the road wheel 9.

The spindle 7 has a bearing at 10 in the upper end of the upright housing and 11 designates a roller bearing of the combined radial and thrust type for supporting the lower end of the spindle. The inner element of this combined radial and thrust bearing is held as by means of a nut 12 against a shoulder 13 of the spindle and the outer element of the bearing is mounted in a seat 14 in the lower end of the housing and rests against an overstanding thrust shoulder 15 at the upper end of the bearing seat. The lower end of the housing is shown as closed by means of a cap 16 screwed into the lower end of the housing and bearing against the outer race ring so as to hold the same seated firmly against the thrust shoulder 15.

A combination radial and thrust bearing 17 is also shown as provided for the wheel, the inner element of this bearing being fixed on the stub shaft by means of the nut 18 and the outer element of the bearing being suitably secured in the hub of the wheel. The hub portion of the wheel is also shown as constructed to form an oil reservoir 19 for the bearing.

This oil reservoir is closed over the outer end of the stub shaft by means of a suitable cap 20 and the inner end of the reservoir, through which the stub shaft projects, is closed by means of cooperating flange elements 21 and 22, the first being in the form of an annular washer secured on the shaft at the end of the inner race ring and the latter being in the form of a cupped flange projecting radially inward over the first flange and carrying an annular washer 23 of felt or other absorbent material, which rotates over the face of the fixed flange 21. The packing washer 23 is shown as secured to the rotating flange 22 by means of rivets or other suitable fastenings 24.

The absorbent washer 23 practically fills the space in between the flanges 21 and 22 and usually extends into a wiping engagement with the surface of the stub shaft. The cooperating overlapping flange elements 21 and 22 thus form a sliding closure for the inner end of the oil reservoir. The fixed flange 21 dips into the oil reservoir and forms a wall covering the greater portion of the absorbent washer and such oil that gets by the edge of the fixed flange and is taken up by the felt washer is, for the most part, thrown outwardly by centrifugal force, so that very little, if any, of this oil is permitted to reach the shaft. In other words, the flange 21 protects the packing washer from the oil bath and as this washer is under rotation, it operates automatically to divert such oil as it may momentarily take up, outward and back, by centrifugal force, into the oil reservoir. A dust-tight packing is thus afforded between the shaft and wheel which is practically oil-tight.

The invention, therefore, provides a wheel bearing which is thoroughly lubricated and which, at the same time, is practically oil-tight and also a bearing for the steering spindle which is located relatively low and well capable of standing all the stresses to which the same may be subjected.

What I claim is:

1. Oil retaining means for bearings comprising in combination with a shaft and a member rotatably engaged thereon and providing an oil reservoir, an outwardly projecting annular flange fixed to the shaft and an inwardly projecting annular washer of absorbent material carried by the rotatable member and slidingly engaging the face of the outwardly projecting flange.

2. In combination with a shaft and a member rotatably engaged thereon and providing an oil reservoir, an outwardly projecting annular flange on the shaft, an inwardly projecting annular flange on the rotatable member overlapping the shaft flange but spaced therefrom and an absorbent washer carried by said rotatable flange in the space aforesaid and slidingly engaging the face of the shaft flange.

3. In combination with a shaft member and an outwardly projecting annular flange carried thereby, and an outer member surrounding the shaft, said members being relatively rotatable, an inwardly projecting annular flange carried by the outer member, overlapping the shaft flange but spaced therefrom and an absorbent washer in said space, secured to the flange of the outer member and slidingly engaging the shaft flange.

4. In combination with a shaft member and an outer member surrounding the same, said members being relatively rotatable and having an oil reservoir therebetween, an outwardly projecting annular flange on the shaft, and extending into the oil reservoir and an annular absorbent washer carried by the outer member and extending radially inward into overlapping engagement over the outwardly extending flange.

In witness whereof, I have hereunto set my hand this 23rd day of June, 1920.

CECIL M. BILLINGS.